United States Patent
DeValve et al.

(10) Patent No.: US 11,743,031 B2
(45) Date of Patent: *Aug. 29, 2023

(54) RING CHAIN ARCHITECTURE

(71) Applicant: The Bank of New York Mellon, New York, NY (US)

(72) Inventors: Daniel DeValve, Bothell, WA (US); Swaminathan Bhaskar, Lawrenceville, NJ (US); Hood Qaim-Maqami, Montclair, NJ (US)

(73) Assignee: The Bank of New York Mellon, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,677

(22) Filed: Mar. 29, 2022

(65) Prior Publication Data

US 2022/0224512 A1 Jul. 14, 2022

Related U.S. Application Data

(63) Continuation of application No. 16/710,475, filed on Dec. 11, 2019, now Pat. No. 11,323,246.

(51) Int. Cl.
*H04L 9/06* (2006.01)
*H04L 43/08* (2022.01)
*H04L 9/32* (2006.01)

(52) U.S. Cl.
CPC .......... *H04L 9/0637* (2013.01); *H04L 9/0643* (2013.01); *H04L 9/3255* (2013.01); *H04L 9/3297* (2013.01); *H04L 43/08* (2013.01)

(58) Field of Classification Search
CPC ... H04L 9/0637; H04L 9/0643; H04L 9/3255; H04L 9/3297; H04L 43/08; H04L 2209/38; H04L 9/3239
See application file for complete search history.

(56) References Cited

U.S. PATENT DOCUMENTS

| | | | |
|---|---|---|---|
| 2010/0153660 A1* | 6/2010 | Lasser | G06F 12/0246 711/154 |
| 2019/0074962 A1* | 3/2019 | Ateniese | H04L 63/061 |
| 2019/0155513 A1* | 5/2019 | Maeda | G06F 16/2322 |
| 2019/0208414 A1* | 7/2019 | Roennow | H04W 80/02 |
| 2019/0340170 A1* | 11/2019 | Pierce | G06Q 20/02 |
| 2020/0389521 A1* | 12/2020 | Brock | H04L 67/108 |

* cited by examiner

*Primary Examiner* — Mohammed Waliullah
(74) *Attorney, Agent, or Firm* — Dinsmore & Shohl LLP (57) ABSTRACT

A system stores transaction data in a ring chain architecture. A ring chain comprises blocks of data stored as a length-limited block chain in a ring buffer configuration. A block of transactions is stored on a ring chain until enough new blocks are added to overwrite the ring buffer with new blocks. The system stores multiple ring chains that update at varying frequencies. A new block on a lower frequency ring chain stores an aggregation of data from the blocks that were added to a higher frequency ring chain in the time since the previous addition of a block to the lower frequency ring chain. Thus, a system of ring chains stores progressively summarized state transition data over progressively longer time intervals while maintaining immutability of the record and reducing storage requirements.

21 Claims, 9 Drawing Sheets

RING CHAIN ARCHITECTURE

CROSS REFERENCE TO RELATED APPLICATIONS

This application is a continuation of copending U.S. application Ser. No. 16/710,475, filed Dec. 11, 2019, which is hereby incorporated by reference in its entirety.

BACKGROUND

Field of Art

This disclosure relates generally to blockchain data storage and more particularly to data storage on bounded blockchain ring structures.

Description of the Art

Blockchain provides a way to immutably record a series of state changes and provide tracking of states over time. In a distributed blockchain, each participant in the system maintains their own state and validates proposed state changes against that state. A blockchain uses a one way function to hash the contents of a block to generate a hash value included in the next block of the blockchain. Each block may also include a set of state transitions (e.g., "transactions") describing changes to the state of the system. In distributed blockchains, consensus on the contents of a next block in the blockchain can be determined through various techniques (e.g., proof of work, proof of elapsed time, proof of stake, etc.), and this reduces a need for trust among the participants of the blockchain network. To determine the state of a system, a participant or other entity can traverse the blocks of the chain to verify that a current state matches the state determined by traversing the blockchain. In this typical scenario, verification can provide confidence in the current state of the system as supported by the blockchain.

However, adopting existing blockchain technologies within an enterprise environment presents some distinct challenges. Enterprise data can include state transitions that are more complex than simple arithmetic, such as in the cases of security movement, documentation of hiring or terminating an employee, and creating or collecting on loans. Recording the complete set of data for each state transition in a traditional blockchain leads to unbounded data growth and consequently to exponential growth of storage costs over time. For example, verifying a state of the system in traditional approaches typically requires traversing the entire history of the blockchain. Blockchain systems often operate inefficiently due to the performance tradeoffs that are required to be able to operate in a zero trust environment. Furthermore, existing blockchain systems are not well suited to handle an evolving model of data or state transitions, that is, they can only store one kind of formatted data and it is difficult to change the stored data format after the initialization of the blockchain. Thus a system that could retain the immutable nature of data storage on a blockchain while also operating more efficiently and adaptively would be beneficial, especially for use in enterprise environments.

SUMMARY

A ring chain architecture provides a set of ring chains, that is, a set of blockchains of limited length. The limited length blockchain may be stored in a ring structure rather than as an unbounded list. Each ring chain in a sequence of ring chains stores progressively aggregated state transition data over progressively longer time intervals. The length of a ring chain defines an upper limit of how many blocks may be stored on the ring chain at one time. Each ring chain also has an associated frequency at which a new block is added to the ring chain. Since the number of blocks of a ring chain is limited, the tail block (i.e., the oldest block) is deleted when the limited length for that ring chain is reached and a new block is added to the ring chain. Thus, the frequency of adding new blocks and the length of the ring chain define the length of time that a block is available on a particular ring chain.

Each block in a ring chain includes a hash of the previous block in the ring chain and a hash of the tail block in the ring chain after the ring chain has advanced. An old tail block is removed from a ring chain to make room in the limited length chain for a new block to be added. The hash of the tail block indicating which block was the tail block when a new block was added allows a party seeking to rely upon a chain of blocks to identify the oldest recorded block in a ring chain and permit traversal forward from that block or backwards to that block from the current block. Each ring chain may also be associated with a state table that updates at least as often as the ring chain tail is updated so that the current state of the system can be reproduced from the transactions recorded in the blocks of the ring chain despite the lack of earlier blocks.

Although blocks of transaction records are deleted after they have reached the tail of a ring chain, the transaction data need not be completely deleted. Instead, a ring chain system is configured to include a sequence of multiple ring chains. Data moves from ring chains that update with a relatively high frequency to ring chains that update at relatively lower frequencies. When it is time for a lower frequency ring chain to add a new block the system accesses one or more of the next higher frequency ring chains in the sequence of ring chains, i.e., those ring chains that feed data directly into the lower frequency ring chain. The data stored on the blocks that were added to the higher frequency ring chains since the last time the lower frequency ring chain was updated is aggregated to generate a new block for the lower frequency ring chain. Each block in a lower frequency ring chain may also include a reference to the start and end of the sequence of blocks in the higher frequency ring chain that is used to produce the new block. Aggregation of blocks with more detailed transaction records may include generating a summary of net state changes over a sequence of aggregated blocks.

The ratios between higher frequency ring chains and lower frequency ring chains can be adjusted to accommodate different parameters for use of the system. These parameters may be related to the length of time that transactions may be corrected or for which records must be retained. For example, a ring chain system may record individual transactions every second on a first ring chain with a length of 175,000 blocks that is overwritten approximately every 48 hours. By aggregating transaction data stored on the blocks added to the first ring chain each hour, account level balance adjustments may be recorded hourly on a second ring chain with a length of 720 blocks that is overwritten monthly. By aggregating the account level balance adjustments of blocks that are added to the second ring chain in a day, complete account balances are recorded daily on a third ring chain with a length of 2,500 blocks that is rewritten approximately every seven years. The ability for the ratios between higher and lower frequency ring chains to be adjusted allows for reconciliation between systems (i.e., disagreement about state) to be bounded by business rationalized time intervals. This has the added benefit of allowing for deletion of specific transaction details after regulatory time periods. The combination of multiple chains having different block frequencies (and lengths) also provides a storage benefit as a ring chain sequence can be tailored to limit the amount of available storage at each level of granularity. A record will be available for reconciliation at a particular level of detail for the length of time that the ring chain storing records at the particular level of detail stores a block before it is overwritten. Thus, in the above example scenario, an individual transaction record is only available for auditing and reconciliation every 48 hours, but daily account balances are available for auditing and reconciliation for seven years.

A ring chain architecture maintains the immutability of a block chain via nesting of hashes. That is, changing a block on a newer, higher frequency ring requires re-computing requisite hashes of the blocks on the lower frequency rings. Furthermore, since the lower frequency ring chains act as composites of the state transitions in the higher frequency ring chains, as consensus is built in higher frequency ring chains, it affirms the consensus built in lower frequency chains.

The way that state is promoted from higher frequency ring chains to lower frequency ring chains is itself beneficial. The promotion can be used to split data which is relevant to individual clients into separate ring chains, and then to rejoin the data in a later ring chain if necessary.

The features and advantages described in this summary and the following detailed description are not limiting and not all-inclusive. Many additional features and advantages will be apparent to one of ordinary skill in the art in view of the drawings, specification, and claims hereof.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
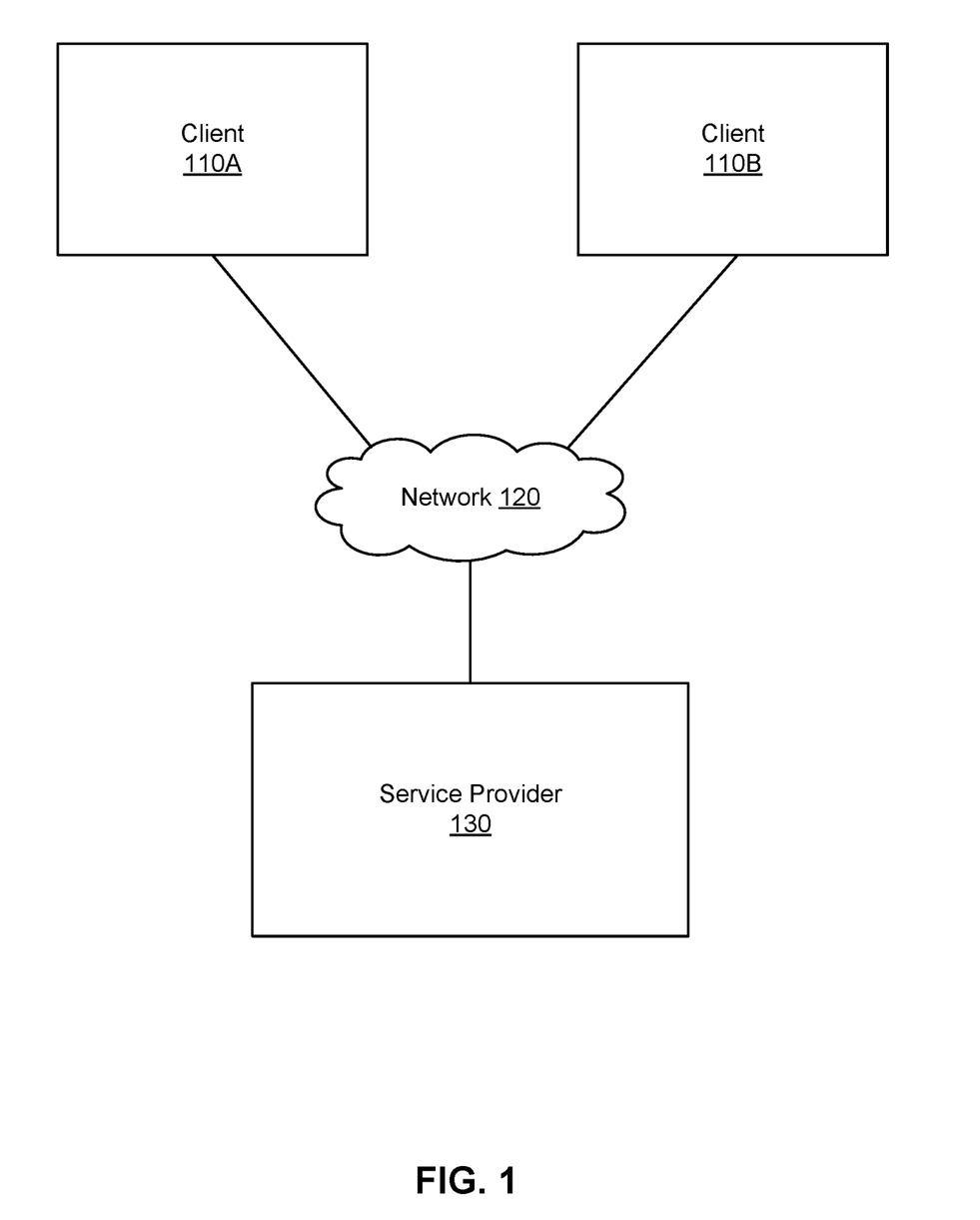
FIG. 1 is a high-level block diagram of a system environment for a service provider maintaining a ring chain system, in accordance with some embodiments.

FIG. 1 is a high-level block diagram of a system environment for a service provider 130 maintaining a ring chain system, in accordance with some embodiments. FIG. 1 includes clients 110, a network 120, and the service provider 130. For clarity, only two clients 110 are shown in FIG. 1 (i.e., client 110A and client 110B). Various embodiments of the system environment can have any number of clients 110. The functions performed by the various entities of FIG. 1 may vary in different embodiments.

The service provider 130 receives transaction requests sent by a client 110. The service provider writes the details of each transaction to a block within a ring chain structure. The service provider 130 manages and maintains a series of ring chains to store information about the received transactions on a set of blockchains. Additional detail about the series of ring chain data structures used by the service provider 130 to store information about the received transactions is provided in reference to later figures. The service provider 130 may also communicate with a client 110 to validate that the client information stored by the service provider 130 is the same as client information stored at the client 110.

An organization or entity may communicate with the service provider 130 through a client 110. Clients 110 can be computing devices such as servers, but may be in the form of other computing devices such as laptop computers, desktop computers, personal or mobile computing devices. In some embodiments, the client 110 may maintain local versions of the client transaction records, and may maintain local copies of ring chains. The transaction records for a client 110 that are stored by the service provider can be validated against the transaction records stored locally at the client 110. In some embodiments, the client 110 includes the same or similar modules as the service provider 130 such that the client 110 is also configured to generate and store transaction records using ring chains.

Clients 110 can communicate with the service provider 130 via a network 120, which may comprise any combination of local area and wide area networks employing wired or wireless communication links. In some embodiments, all or some of the communication on the network 120 may be encrypted.

Figure 2:
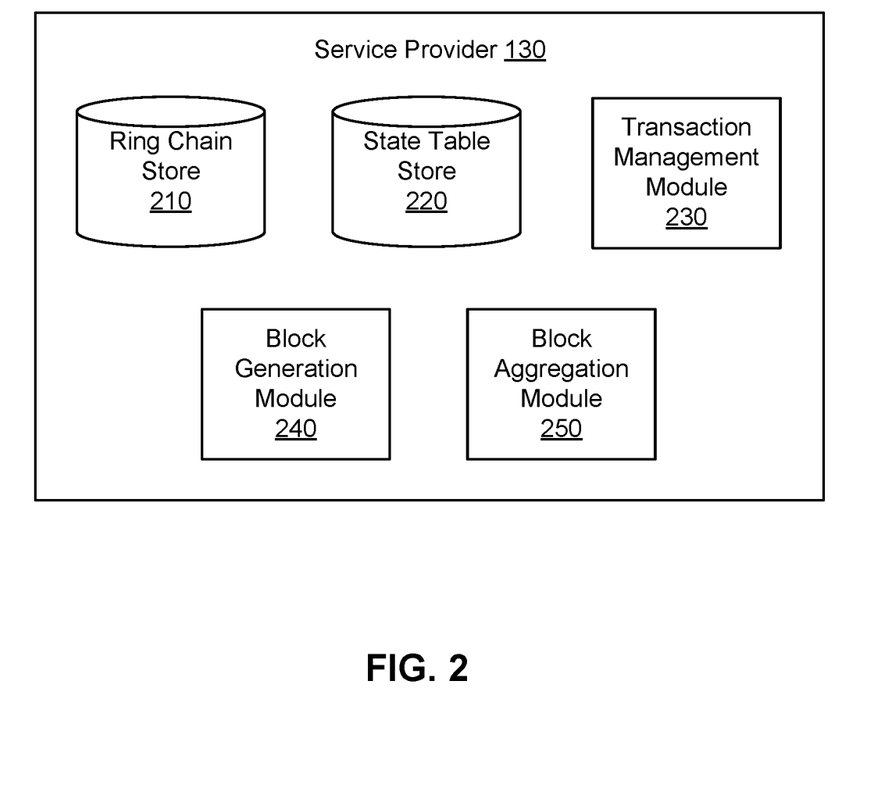
FIG. 2 is a high-level block diagram of a system architecture of a service provider, in accordance with an example embodiment.

FIG. 2 is a high-level block diagram of a system architecture of a service provider 130, in accordance with an example embodiment. The service provider 130 includes various modules and data stores to store transaction data using ring chains. The service provider 130 comprises a ring chain store 210, a state table store 220, a transaction management module 230, a block generation module 240, and a block aggregation module 250. Computer components such as web servers, network interfaces, security functions, load balancers, failover servers, management and network operations consoles, and the like are not shown so as to not obscure the details of the system architecture. Additionally, the service provider 130 may contain more, fewer, or different components than those shown in FIG. 2 and the functionality of the components as described herein may be distributed differently from the description herein.

The ring chain store 210 stores data related to the contents and structure of ring chains. A "ring chain" as described herein, is a blockchain stored in a ring structure rather than as an unbounded sequence of blocks. In one embodiment, a ring chain comprises a closed sequence of data blocks stored in a ring buffer data structure. In alternate embodiments, the ring chain may not store the data blocks in a ring buffer data structure, but the data blocks, stored in an alternate data structure by the ring chain store 210, may be accessed and removed from the system sequentially as though they were stored in a ring buffer data structure. A ring buffer is a data structure which uses a fixed amount of memory to record the last n given elements in a sequence, where n is a number of memory spaces allotted to store items in the ring buffer. When the n memory spaces associated with the ring buffer are full, the newest element overwrites the oldest element of the ring buffer, taking the space in memory and thus conceptually creating a "ring," of data elements, here the data blocks.

Each data block in a ring chain records the hash of the predecessor block in the ring chain and also records the hash of the current tail of the ring chain. That is, in addition to storing a hash of the previous block in the chain, a new block added to a ring chain also stores a hash of the block that is the oldest block in the chain at the time the new block is added to the ring chain. This makes it possible for a party seeking to rely upon a chain of blocks in a ring chain to know when it has reached the oldest recorded block in the ring chain. A block in a ring chain may also store metadata associated with the block and a body including data about a set of transactions, e.g., a list of state changes, that are stored on the block.

New blocks are added to a ring chain at predetermined intervals. Most of the examples included herein use predetermined time intervals and ring chains are described with respect to relative frequencies with which new blocks are added. However, parameters used to measure intervals can vary according to different implementations. Each ring chain has an associated predetermined frequency, i.e., an associated rate at which new blocks are added to the ring chain. Thus, when an amount of time equal to the number of spaces available for blocks on a ring chain multiplied by the rate at which blocks are added to the ring chain has elapsed, the ring chain begins discarding old blocks from the end of the ring chain to accommodate new blocks that are added to the ring chain. The length of a ring chain and the frequency at which a ring chain acquires new blocks are tunable parameters that can be adjusted to satisfy business requirements.

In some embodiments, the tuning of parameters or metrics associated with a ring chain can be changed over time. For example the time interval associated with collection of data for a new block on a ring chain or the number of blocks in the ring chain can be updated. In some embodiments, these changes may be introduced to a ring chain by including metadata changes within the blocks themselves, i.e., including metadata about the chain within the chain. The metadata changes need to be preserved as the chain overwrites old data with new blocks. To preserve the changes, the metadata may be moved to lower frequency ring chains as the ring chain system updates, or the metadata may be periodically rewritten among blocks within the same ring chain, according to various implementations.

As mentioned above, some implementations may use metrics or block characteristics other than time to determine when new blocks are to be added to a ring chain. Once one or more characteristics associated with a set of blocks satisfies a predetermined condition required for inclusion in a lower frequency ring chain, the information from the set of blocks may be aggregated to be included in a new block of the lower frequency ring chain. As an example, a new block may be added to a ring chain whenever a predetermined amount of data has been accumulated for storage in which case the frequency that new blocks are added to the ring chain may be dependent on data density rather than time. In various embodiments, a parameter can be used to control the ring chains with a consensus algorithm that accounts for discrepancies in the chosen parameter among ring chains held by different parties of a distributed ring chain system.

Subsequent ring chains in such a sequence of ring chains may have different rates at which new blocks are added to the ring chain. In some embodiments, this may be analogous to a sequence of gears where each subsequent gear turns slower than the previous gear. For example, a first ring chain may record any transactions between accounts that occur every second in a new block on the ring chain. A second, lower frequency ring chain may record a block every hour where a block in the second ring chain includes the net change in the accounts associated with the transactions that occurred on the first ring chain in the last hour. To continue the example, a third, even lower frequency ring chain may record a block every day where a block in the third ring chain includes a net change to the accounts associated with the transactions on the second ring chain in the previous day. Thus, the ring chain store 210 may store multiple ring chains and the blocks within the different ring chains may store data at different levels of granularity and in different formats.

The data from old blocks of a ring chain can thus be aggregated and stored as a single block on another ring chain. For example, consider a higher frequency ring chain that adds a new block every minute and stores 360 blocks and a lower frequency ring chain that adds a new block every hour and stores twenty-four blocks. Each new block in this lower frequency ring chain stores aggregated information about the last sixty blocks of the high frequency ring chain. According to this example, by the time a block is removed from the higher frequency ring chain, the data stored on the block was aggregated into a block of the lower frequency ring chain about 300 blocks previously (i.e., about five hours previously). Thus, information about a transaction can be stored simultaneously at differing levels of granularity on ring chains in a sequence of ring chains.

The state table store 220 stores state tables associated with the ring chains stored in the ring chain store 210. In one embodiment, each ring chain stored in the ring chain store 210 is associated with a state table stored in the state table store 220. A state table keeps track of the current state of a system as changed by the transactions stored in the ring chain. For example, a state table may hold current balances of accounts for parties associated with the ring chain. In one embodiment, a state table is updated at least as often as the rate at which its associated ring chain is updated with new blocks. In an unbounded blockchain, a current state of a system can be determined by starting at the initial state of the system and following the state changes recorded in the entire blockchain. Since a ring chain overwrites old blocks, a current head of a ring chain needs to have an associated state, as stored in the state table, such that the current state of the system can be determined based on the transactions stored on the ring chain. Thus, the system can verify whether transactions are permissible, e.g., in a case of a ring chain system used to track documents, the system may verify whether a document has an unsigned state in a state table to verify that the document can be signed.

The transaction management module 230 receives transaction data from clients 110 and processes and records the transactions. In various embodiments, the transaction management module 230 passes information from the transaction request on to other components of the service provider 130 that can execute the transaction. In one embodiment, the transaction management module 230 may execute the requested transaction, e.g., by updating asset positions of parties involved in the transaction according the transaction request.

The transaction management module 230 accesses a state table, stored in the state table store 220, associated with a higher frequency ring chain that stores detailed transaction records to determine whether the parties involved in the transaction request have sufficient resources to make the transaction. Responsive to determining that the involved parties do have sufficient resources to make the transaction, the transaction management module updates the state table associated with the ring chain. The transaction management module 230 also adds the transaction to a set of transactions that are to be included when a next block is added to the ring chain. In various implementations, the transaction management module 230 may execute the transaction at the time it is written to the ring chain or may write the transaction to the ring chain prior to performing any external action (e.g., transmitting a message, validating a transaction). That is, a transaction may be written to a local ring chain, but the triggering of the performance of an operation or a transaction off the blockchain may be delayed until enough other participants in a distributed ring chain system agree with the transaction and write the same block to other ring chains, thus validating the transaction.

The block generation module 240 generates blocks to be added to the ring chains. To generate a block for a ring chain that records original transaction data (i.e., a ring chain that records transactions received at the transaction management module 230), the block generation module 240 creates a block of transactions records that have been collected by the transaction management module 230 in the previous time interval, as indicated by the rate at which the ring chain adds new blocks. The block generation module 240 generates a block that includes records of the set of collected transactions, a hash of the previous block in the ring chain, a hash of the block that will be the oldest block in the ring chain once the new block is added to the ring chain, and may optionally include additional metadata about the block. The block generation module 240 adds the new block to the ring chain stored in the ring chain store 210. In many cases, adding a new block to a ring chain includes removing the oldest block from the ring chain to maintain a fixed length of the ring chain.

The block generation module 240 also generates blocks for lower frequency ring chains. A block for a lower frequency ring chain may include aggregated information about one or more blocks stored in one or more previous, higher frequency ring chains, e.g., aggregated or net transaction records. In particular, the block generation module 240 identifies the blocks in a higher frequency ring chain that were added to the higher frequency ring chain since the last time a new block was generated for the lower frequency ring chain, and includes the data from this set of blocks when it aggregates the data into the new block on the low frequency ring chain. The aggregated transaction data from a higher frequency ring chain may include the same information as the data in a state table associated with the higher frequency ring chain, i.e., the new block of the low frequency ring chain includes data from the state table of the higher frequency ring chain. Storing the state table data from a high frequency ring chain in a block of a lower frequency ring chain enables recovery of the system by reading data from varying frequencies of rings to rebuild the state tables from the stored information. A block in a lower frequency ring chain thus includes a body of aggregated transaction data, a hash of the previous block in the ring chain, a hash of the block that will be the oldest block in the ring chain once the new block is added to the ring chain, and may optionally include additional metadata about the block.

In some embodiments, ring chains stored in the ring chain store 210 may store data in varying formats within the blocks of the chain. The block generation module 240 generates blocks such that the data stored in the body of each block is generally formatted the same among blocks within a single ring chain. However, different ring chains may have different data formats for the data stored in their blocks. As one example, a higher frequency ring chain may store details about transaction records within the body of a block, and when the transaction records are aggregated, they may be stored in a different format in a lower frequency ring chain which stores a more summarized format of the data in the bodies of its blocks. The ability to aggregate data into different formats as it is moved to higher level ring chains means that a ring chain architecture can adapt to system changes over time, and makes a ring chain storage system particular suitable to enterprise environments. For example, an organization associated with a client 110 may have a need to change the format or data types that are included in a transaction record, due to updated storage requirements or new regulations. As long as the data can be aggregated into a predetermined format when it is moved to a lower frequency ring chain, the client 110 will be able to update the format of the data that is provided, by replacing the higher frequency, client-specific ring chain with a new ring chain that can store the transaction records with the updated format. Thus, the ring chain architecture of the service provider 130 can be tailored to different clients 110 at higher frequency ring chains which may be specific to the individual clients 110 while also aggregating data from multiple clients 110 to be stored in the same data format at lower frequency ring chains. In some embodiments, the block generation module 240 may access configuration instructions related to each ring chain to determine how data storage should be formatted for different ring chains.

Similarly, an organization or enterprise associated with a client 110 can change the length of time that transaction record data persists at different levels of granularity by changing the rates and sizes of client-specific higher frequency ring chains that store transaction records for the client 110. A higher frequency ring chain may hold fewer blocks and update quickly, but the size or update intervals for the ring chain can be adjusted to suit the needs of the client 110 associated with the ring chain. In one example, a client may be required by certain regulations to delete certain details of transaction records after a number of weeks. A ring chain can be tuned such that after the required number of weeks has elapsed, the ring chain will begin overwriting the old transaction records with new blocks and the lower frequency ring chain to which the data is promoted could have a format that does not include the details that need to be discarded. As another example, a ring chain system may include ring chains and unbounded blockchains, thus, for example, storing all transaction records at a high level of detail in an unbounded blockchain while also aggregating the transaction records into the lower frequency ring chains.

The block aggregation module 250 aggregates data from blocks in one or more higher frequency ring chains to be saved in a block of a lower frequency ring chain. In one embodiment, the block aggregation module 250 may keep track of how often each ring chain in the ring chain store 210 needs to be updated. In another example embodiment, the block aggregation module 250 may receive a notification from the ring chain store 210 or from another configuration file indicating that a ring chain in the ring chain store 210 needs to be updated.

To update a ring chain, the block aggregation module 250 identifies the one or more higher frequency ring chains that feed data into the lower frequency ring chain that is to be updated. The block generation module 250 further identifies the set of blocks that have been added to each of the higher frequency ring chains in the time interval since the last time the lower frequency ring chain was updated. The data from the bodies of each of the blocks in the set of identified blocks is aggregated into a data format of the blocks stored in the lower frequency ring chain and transmitted to the block generation module 240 to be stored as a new block on the lower frequency ring chain. As an example, a ring chain that adds a new block every hour may incorporate summarized data from the most recent sixty blocks of a higher frequency ring chain that adds a new block every minute. In some embodiments, such a data summary might take the form of a net change in account balances over the previous hour. In some embodiments, this data summary might take the form of a backup of the state table data stored in the state table store 220 as associated with the higher frequency ring chain in the last hour. As another example, in a lower frequency ring chain that adds a block daily, a block may include a backup of the state table store for the day that is associated with a higher frequency ring chain.

Figure 3A:
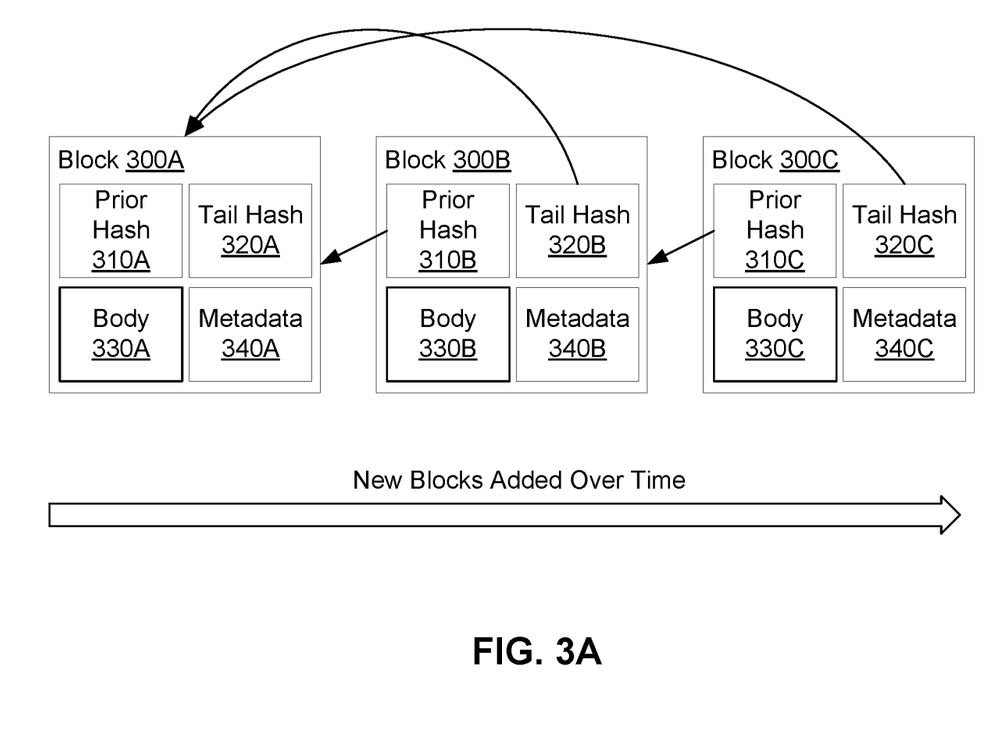
FIG. 3A is an illustration of an example ring chain, in accordance with an embodiment.

FIG. 3A is an illustration of an example ring chain, in accordance with an embodiment. The example ring chain of FIG. 3A accommodates three blocks 300 at a time. The example ring chain of FIG. 3A includes blocks 300A, 300B, and 300C. In various embodiments, a ring chain may be configured to store any number of blocks 300. Each block 300 of the ring chain includes a prior hash 310, a tail hash 320, a body 330, and metadata 340. Each hash references a prior block of the ring chain, which is identified by a hash of the prior block. Accordingly, the reference arrows in FIGS. 3A-3C originate from stored hashes and point to the blocks that are referenced by the hashes. The prior hash 310 is a hash of the block 310 that came immediately prior to the block 330 in the ring chain. For example, block 300C includes a prior hash 310C of block 300B. The tail hash 320C is a hash of the block 300 that is the tail of the ring chain when a new block 300 is added to the head of the ring chain. For example, in FIG. 3A, block 300A is the tail of the ring chain and blocks 300B and 300C include tail hashes 320B and 320C that point back to block 300A. The body 330 of a block 300 includes the transaction records or whatever other format or type of data is held in the ring chain. Each block 300 may also include metadata 340 which may include information about the ring chain or information about the body 330, in various embodiments.

In various embodiments, the prior hash 310 and tail hash 320 may be one way hash values that are generated using a one-way hash function, such as a message digest algorithm 5 (MD5), a secure hash algorithm (e.g., SHA-0, SHA-1, SHA-2, or SHA-3), BLAKE, or other hash functions.

Figure 3B:
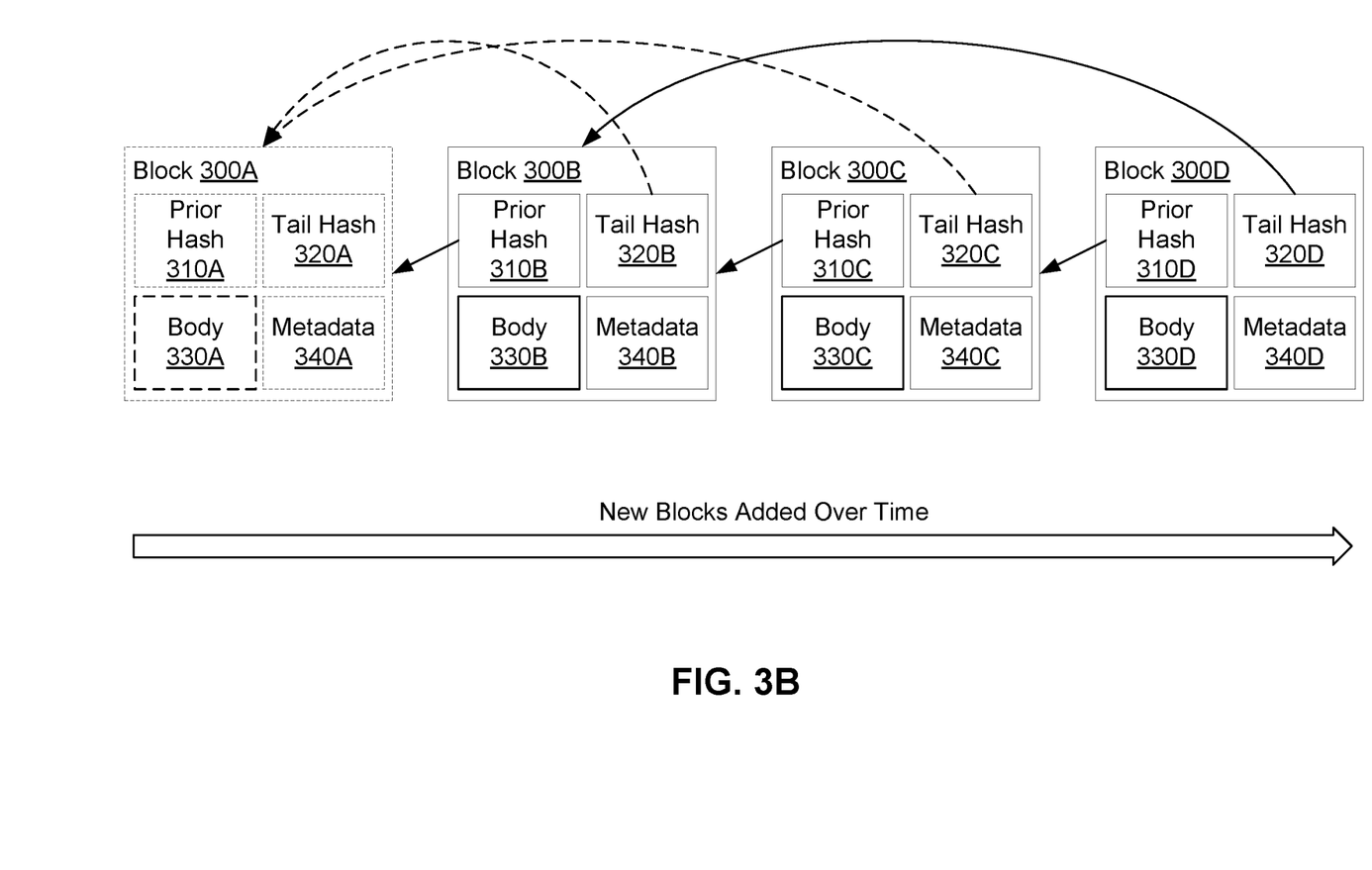
FIG. 3B illustrates the addition of a new block to the example ring chain, in accordance with an embodiment.

FIG. 3B illustrates the addition of a new block 300 to the example ring chain, in accordance with an embodiment. In the example of FIG. 3B, block 300D is added to the head of the example ring chain from FIG. 3A. Block 300D includes a prior hash 310D of the block 300C immediately prior to it in the ring chain. Block 300D also includes a tail hash 320D of block 300B, which is the new tail block in the ring chain. Since the example ring chain only accommodates three blocks 300 at once, the previous tail block 300A is removed (as indicated by the dotted lines) from the ring chain to make room for the new block 300D.

Figure 3C:
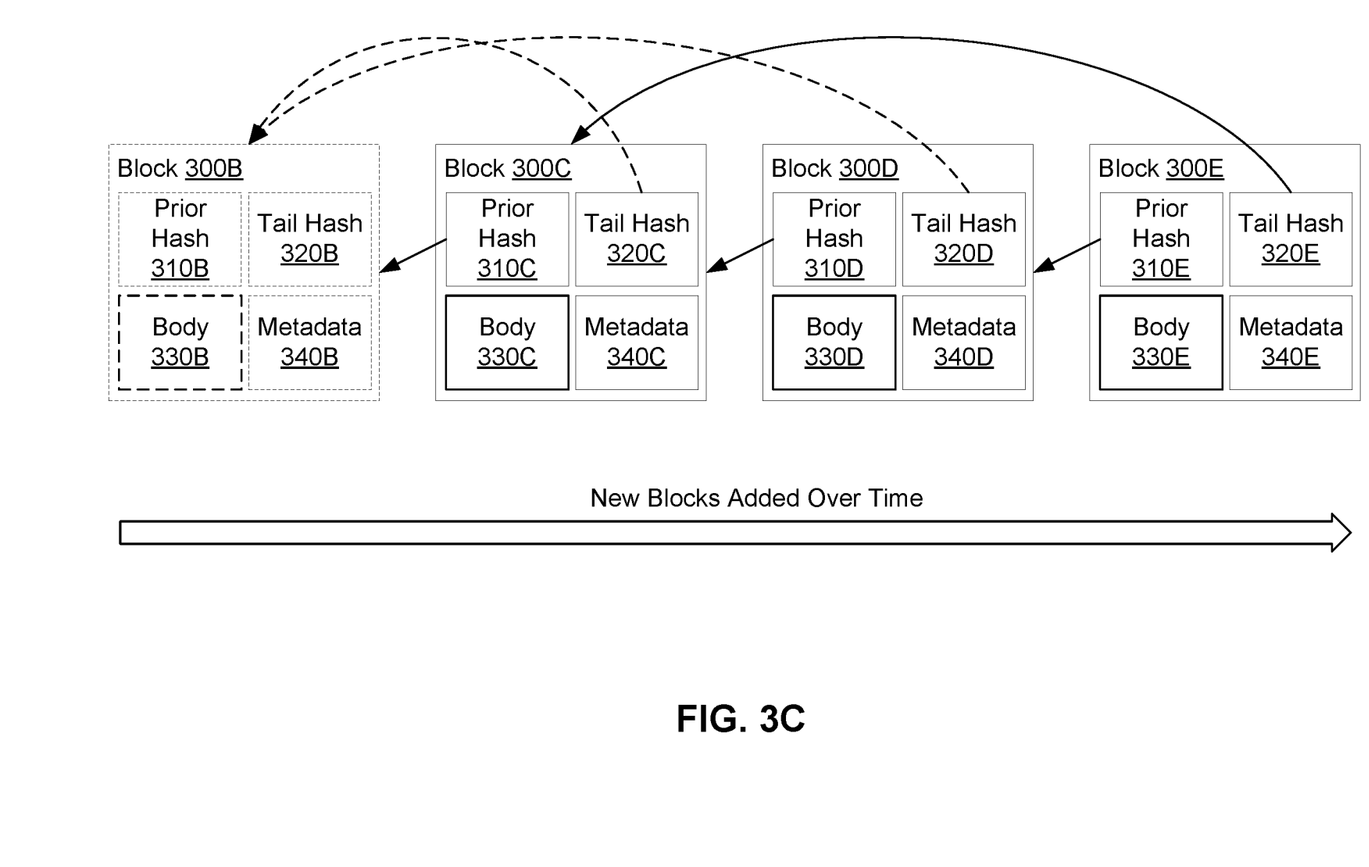
FIG. 3C illustrates a further addition of a new block the example ring chain, in accordance with an embodiment.

FIG. 3C illustrates a further addition of a new block 300 the example ring chain, in accordance with an embodiment. In the example of FIG. 3C, block 300E is added to the head of the example ring chain. Block 300E includes a prior hash 310E of the block 300D immediately prior to it in the ring chain. Block 300E also includes a tail hash 320E of block 300C, which is the new tail block in the ring chain. Since the example ring chain only accommodates three blocks 300 at once, the previous tail block 300B is removed (as indicated by the dotted lines) from the ring chain to make room for the new block 300E.

Figure 4:
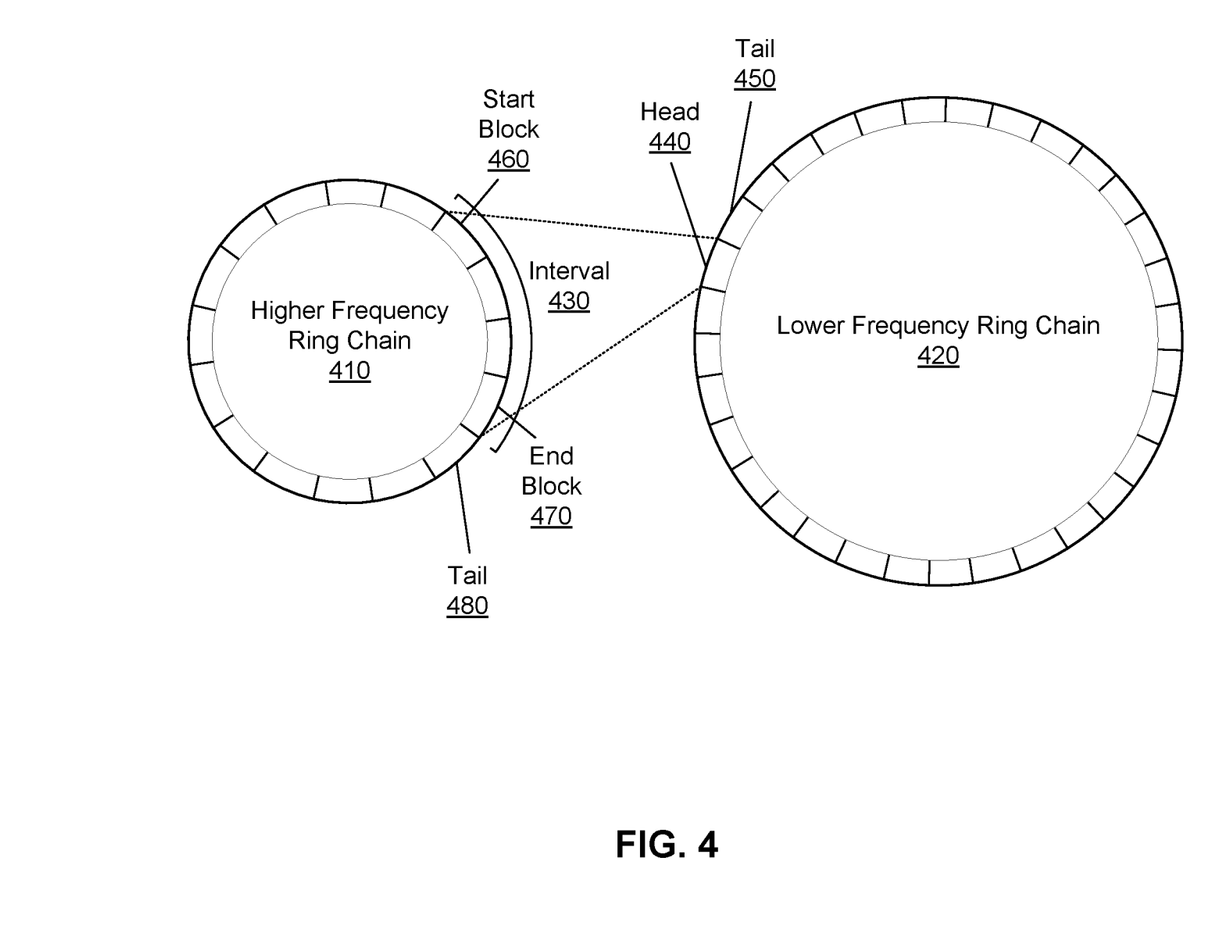
FIG. 4 is an example illustration of an aggregation of blocks from a higher frequency ring chain into a single block of a lower frequency ring chain, in accordance with an embodiment.

FIG. 4 is an example illustration of an aggregation of blocks from a higher frequency ring chain into a single block of a lower frequency ring chain, in accordance with an embodiment. FIG. 4 shows a higher frequency ring chain 410 and a lower frequency ring chain 420. A new head 440 block is added to the lower frequency ring chain 420 every time an interval 430 of time has elapsed. In the time interval 430 since the last time a new block was added to the lower frequency ring chain, the higher frequency ring chain 410 shown in FIG. 4 adds four new blocks, from a start block 460 through an end block 470. In some embodiments, the end block 470 may also be the head block of the higher frequency ring chain, i.e., the most recent block to have been added to the higher frequency ring chain 410. When it is time to add another block to the lower frequency ring chain 420, the block aggregation module 250 identifies the set of blocks that were added to the higher frequency ring chain 410 in the past interval 430 of time, and aggregates the data from the body of each of the blocks in the set of blocks to be included in the new head 440 block of the lower frequency ring chain 420. In cases in which data from multiple higher frequency ring chains 410 promote their data to the lower frequency ring chain 420, the block aggregation module 250 collects the blocks that were added to each of the multiple higher frequency ring chains in the past interval 430 of time (e.g., since the last time a block was added to the lower frequency ring chain) to be included in the new head 440 block of the lower frequency ring chain 420. The new tail 450 block of the lower frequency ring chain and the tail 480 block of the higher frequency ring chain are also illustrated in FIG. 4 for reference. To extend the metaphor of the ring in a way readers may find intuitive, as blocks are added to and removed from both ring chains shown in FIG. 4, one can imagine them both rotating in a counterclockwise direction, at different rates.

Figure 5:
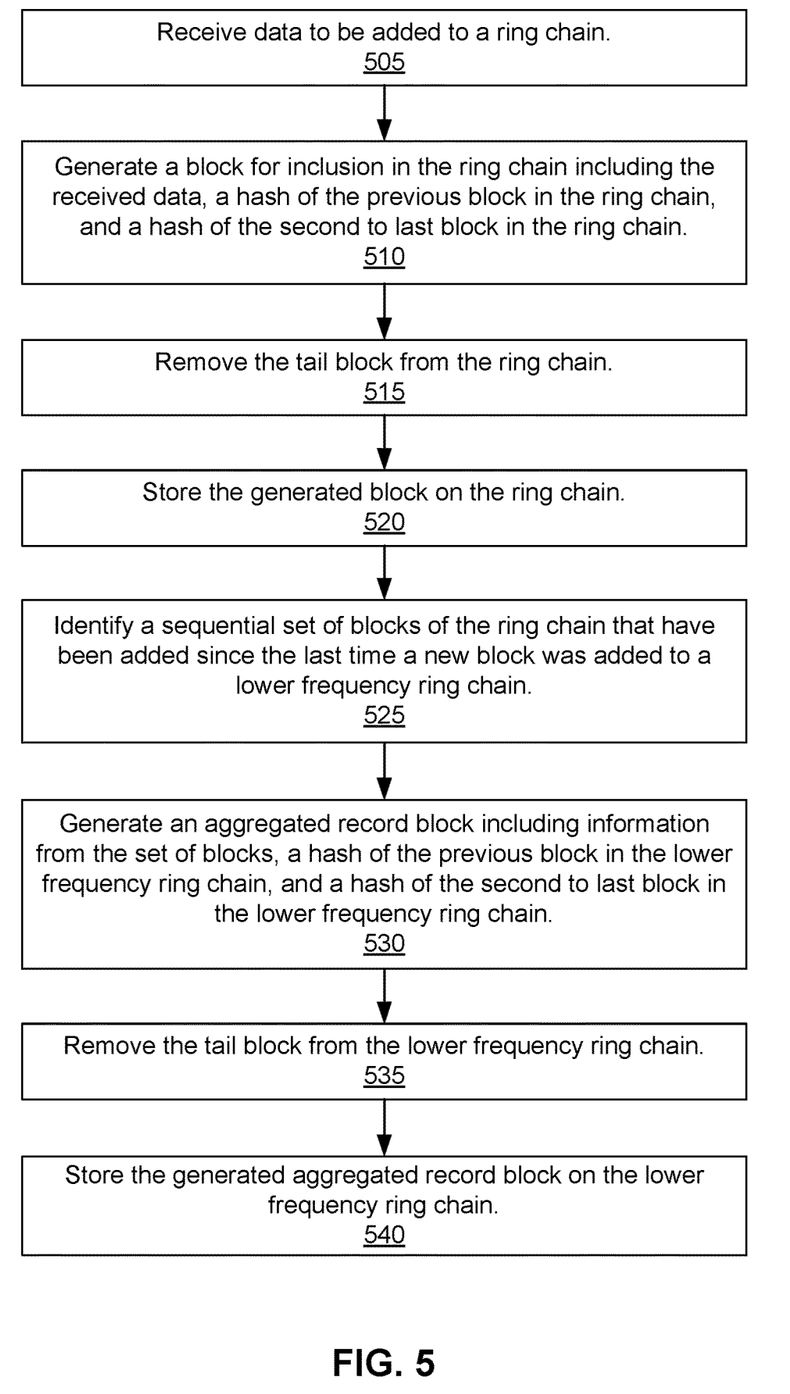
FIG. 5 is a flowchart illustrating a process for updating a ring chain system, in accordance with an example embodiment.

FIG. 5 is a flowchart illustrating a process for updating a ring chain system, in accordance with an example embodiment. The service provider 130 receives 505 data to be added to a ring chain. The service provider generates 510 a block for inclusion in the ring chain. The generated block includes the received data, a hash of the previous block to be stored on the ring chain, and a hash of the second to last block stored on the ring chain, i.e., the block that will become the new tail of the ring chain when the generated block is added to the ring chain, displacing the old tail block. The tail block is removed 515 from the ring chain and the service provider 130 stores 520 the generated block on the ring chain.

To aggregate data from the higher frequency ring chain to a lower frequency ring chain, the service provider identifies 525 a sequential set of blocks of the ring chain that have been added to the ring chain since the last time a new block was added to the lower frequency ring chain. The service provider generates 530 an aggregated record block that includes information from the identified set of blocks from the higher frequency ring chain. The aggregated record block may include data from the set of blocks, a hash of the previous block in the lower frequency ring chain, and a hash of the second to last block in the lower frequency ring chain, i.e., the block that will become the new tail of the lower frequency ring chain. The service provider removes 535 the tail block from the lower frequency ring chain and stores 540 the generated aggregated record block on the lower frequency ring chain.

Figure 6:
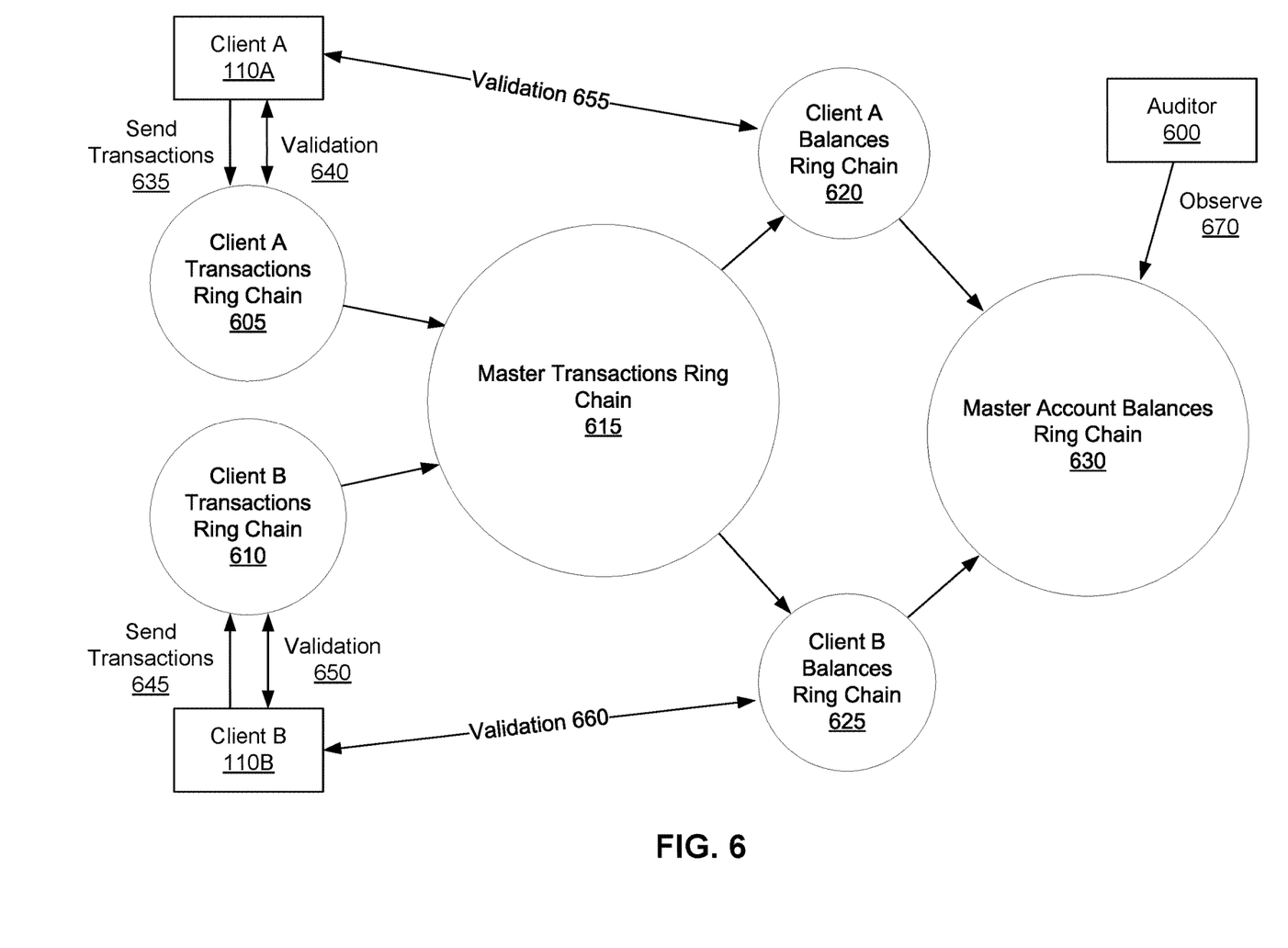
FIG. 6 illustrates an example of a ring chain system that stores account balances for multiple clients in accordance with an embodiment.

FIG. 6 illustrates an example of a ring chain system that stores account balances for multiple clients in accordance with an embodiment. The example of FIG. 6 includes client A 110A and client B 110B. As an example, client A 110A and client B 110B may be associated with entities or organizations that interact with the service provider 130 to store their transaction records. Client A 110A sends transactions 635 to the service provider 130, where the transactions are included in blocks of a client A transactions ring chain 605. In some embodiments, the service provider 130 may communicate with client A 110A to validate 640 the transaction records stored at the client A transactions ring chain 605, for example, against a local ring chain that may be stored by client A 110A. Similarly, client B 110B sends transactions 645 to the service provider 130, where the transactions are included in blocks of a client B transactions ring chain 610. In some embodiments, the service provider 130 may communicate with client B 110B to validate 650 the transaction records stored at the client B transactions ring chain 610, for example, against a local ring chain that may be stored by client B 110B.

In the example of FIG. 6, the service provider 130 stores a master transactions ring chain 615. When it is time for a new block to be added to the master transactions ring chain 615, i.e., when a predetermined time interval associated with a rate for adding blocks to the master transactions ring chain 615 has elapsed since the addition of a previous block, the service provider 130 identifies the blocks of the client A transactions ring chain 605 and the client B transactions ring chain 610 that have been added to the ring chains since the previous time a block was added to the master transactions ring chain 615. The identified blocks from the client A transactions ring chain 605 and the client B transactions ring chain 610 are aggregated such that the transaction record data from each of the identified blocks is included in a new block that is added to the master transactions ring chain 615.

The example of FIG. 6 further includes a client A balances ring chain 620 and a client B balances ring chain 625. When it is time for a new block to be added to the client A balances ring chain 620, the service provider 130 identifies and accesses the blocks that were added to the master transactions ring chain 615 since the last time a block was added to the client A balances ring chain 620. The transaction record data related to client A 110A transactions is extracted from the identified blocks of the master transactions ring chain 615 and aggregated into a new block that is added to the client A balances ring chain 620. In some embodiments, the aggregation step involves a summarization of the transaction data, e.g., in the form of account balances related to the individual transaction records that were initially sent to the client A transactions ring chain 605. In some embodiments, the client A 110A may communicate with the service provider 130 to validate 655 the balances stored at the client A balances ring chain 620. For example, the organization or entity associated with client A 110A may store local ring chains that aggregate data in the same or similar formats and at the same or similar rates as the ring chains hosted by the service provider 130, and may validate that the service provider 130 has the same balance values recorded for the aggregated transactions. As shown in the example of FIG. 6, the client balances ring chain 625 may be updated in a process similar to that of the client A balances ring chain 620 update process, and may also be similarly validated 660 with the information stored at client B 110B.

In the example of FIG. 6, the service provider includes a master account balances ring chain 630. As with the other ring chains, when a predetermined interval for updating the master account balances ring chain 630 has elapsed, the data from the blocks that were added to the client A balances ring chain 620 and the blocks that were added to the client B balances ring chain 625 in the time since the last block was added to the master account balances ring chain 630 is aggregated to be included in a new block that is added to the master account balances ring chain 630. For example, the net change in account balances from the previous block on the master account balances ring chain 630 of accounts associated with transactions stored by the service provider 130 are recoded in the new block of the master account balances ring chain 630 by recording the summaries of the transactions that were added to the higher frequency ring chains in the time since the previous block was added to the master account balances ring chain 630.

In some embodiments, an auditor 600 may observe 670 ring chains stored by the service provider 130. For example, the auditor 600 may be granted access to view the blocks of the master account balances ring chain 630 for regulatory or oversight purposes. A ring chain architecture may be beneficial for auditing purposes because it maintains the immutability of a blockchain via nesting of hashes (i.e., changing the outermost ring would require re-computing requisite hashes of the inner ring used to build the outer dataset), while also summarizing the transaction records. For example, an auditor may not be interested in viewing many millions of individual transactions, but may need to see account balances over the course of a day, week, or year, which can be better represented and more efficiently stored and accessed in a lower frequency ring chain.

Since individual transaction record details may be aggregated or summarized as they are promoted through a series of ring chains, validation or auditing of a particular transaction at different levels of granularity can only occur for as long as the transaction record is present on a block of a ring chain that records transaction records at the granularity level of interest. As one example, an auditor may be able to access daily account balances stored at a lower frequency ring chain for any day in the past seven years, but may only be able to access details of individual transactions that occurred within the last ninety days. In some embodiments data on a block of a lower frequency ring chain identifies the start and end blocks of a set of blocks in the higher frequency ring chain that were aggregated to make the lower frequency ring chain block. If the identified start and end blocks are still present on the higher frequency ring chain when the data on the block of the lower frequency ring chain is being audited or reconciled, then the more detailed transaction data is still available for reconciliation. A ring chain sequence may be configured according to the needs of the particular entity, enterprise, or organization for which it stores data. In addition to a series of ring chains with different update frequencies, a ring chain architecture can include ring chains for separating different types, e.g., for ease of access. For example, a ring chain sequence may include separate ring chains associated with individual clients of an organization that are generated from a higher frequency ring chain that stores data related to all of the clients. As another example, a ring chain may be configured to store data that is relevant to a specific regulator.

Due to the summarization of data over time, a ring chain system architecture may be well suited to a partial trust environment, such as an enterprise environment. The time that data is present on a ring chain can be set based on, for example, legal requirements for record keeping and data correction. At the same time, the lower frequency ring chains allow for easier long term data maintenance and verification without indefinite data growth of adding individual transactions to one unbounded blockchain.

Figure 7:
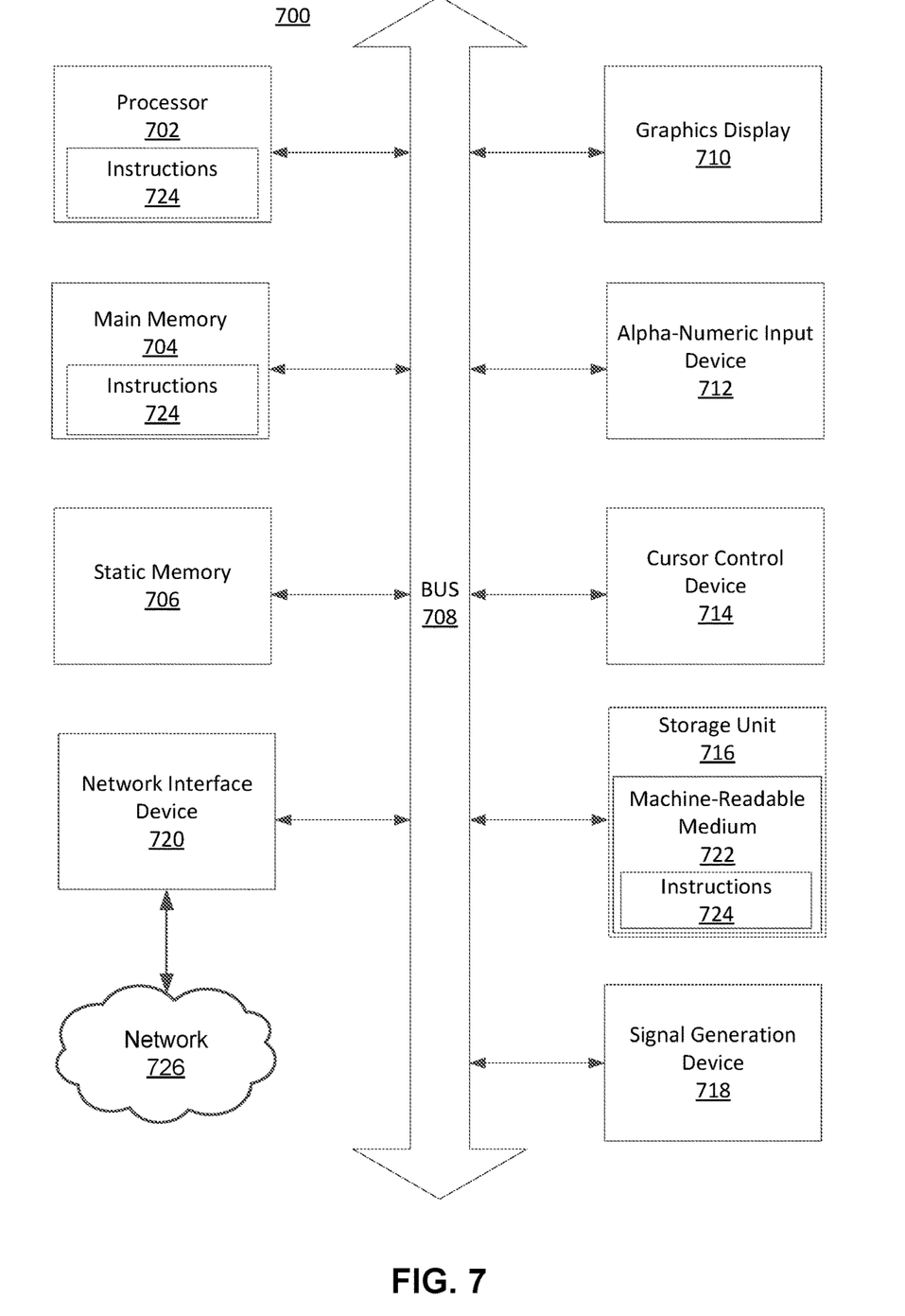
FIG. 7 is a block diagram illustrating components of an example machine able to read instructions from a machine-readable medium and execute them in one or more processors, in accordance with an embodiment.

FIG. 7 is a block diagram illustrating components of an example machine able to read instructions from a machine-readable medium and execute them in one or more processors (or controllers). Specifically, FIG. 7 shows a diagrammatic representation of the service provider 130 in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 706 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the transaction management module 230, the block generation module 240, and the block aggregation module 250. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 120, via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method for storing data in a ring chain, the method comprising:
   receiving data to be added to the ring chain;
   generating a block for inclusion in the ring chain, the block comprising the received data, a hash of a previous block that was added to the ring chain, and a hash of a second oldest block in the ring chain disposed at least one position before the previous block that was added to the ring chain;
   removing a tail block from the ring chain, wherein the tail block is an oldest block stored on the ring chain; and
   storing the generated block to the ring chain.

2. The computer-implemented method of claim 1, wherein a ring chain comprises an ordered set of data blocks wherein the number of data blocks in the set is limited.

3. The computer-implemented method of claim 1, the method further comprising:
   monitoring a set of blocks that includes blocks that are added to the ring chain subsequent to the addition of a new block to a lower frequency ring chain;
   determining one or more characteristics associated with the set of monitored blocks; responsive to the one or more characteristics associated with the set of monitored blocks satisfying a predetermined condition associated with the lower frequency ring chain;
   generating an aggregated record block for inclusion in the lower frequency ring chain, the aggregated record block comprising aggregated data from monitored set of blocks of the ring chain, a hash of the previous block that was added to the lower frequency ring chain, and a hash of a second oldest block in the lower frequency ring chain;
   removing a tail block from the lower frequency ring chain, wherein the tail block is the oldest block stored on the lower frequency ring chain; and
   storing the generated aggregated record block to the lower frequency ring chain.

4. The computer-implemented method of claim 3, wherein the one or more characteristics associated with a block in the set of monitored blocks includes a time that the block was added to the ring chain and wherein the predetermined condition associated with the lower frequency ring chain is an amount of time that has passed since the addition of the new block to the lower frequency ring chain.

5. The computer-implemented method of claim 3, wherein the one or more characteristics associated with a block in the set of monitored blocks includes an amount of data stored in the block and wherein the predetermined condition associated with the lower frequency ring chain is a threshold amount of data stored among the set of monitored blocks.

6. The computer-implemented method of claim 3, wherein new blocks are added to the ring chain with higher frequency than the rate at which new blocks are added to the lower frequency ring chain.

7. The computer-implemented method of claim 3, wherein the aggregated data from the set of blocks includes identification of a first block and a last block in the monitored set of blocks of the ring chain.

8. The computer-implemented method of claim 3, wherein the data in the aggregated record block further comprises aggregated data from an identified set of blocks of a third ring chain, wherein new blocks are added to the third ring chain with higher frequency than the rate at which new blocks are added to the lower frequency ring chain.

9. A computer system comprising:
   one or more computer processors for executing computer program instructions; and
   a non-transitory computer-readable storage medium storing instructions executable by the one or more computer processors to perform steps comprising:
      receiving data to be added to the ring chain;
      generating a block for inclusion in the ring chain, the block comprising the received data, a hash of a previous block that was added to the ring chain, and a hash of a second oldest block in the ring chain disposed at least one position before the previous block that was added to the ring chain;
      removing a tail block from the ring chain, wherein the tail block is an oldest block stored on the ring chain; and
      storing the generated block to the ring chain.

10. The computer system of claim 9, wherein a ring chain comprises an ordered set of data blocks wherein the number of data blocks in the set is limited.

11. The computer system of claim 9, the steps further comprising:
   monitoring a set of blocks that includes blocks that are added to the ring chain subsequent to the addition of a new block to a lower frequency ring chain;
   determining one or more characteristics associated with the set of monitored blocks; responsive to the one or more characteristics associated with the set of monitored blocks satisfying a predetermined condition associated with the lower frequency ring chain;
   generating an aggregated record block for inclusion in the lower frequency ring chain, the aggregated record block comprising aggregated data from monitored set of blocks of the ring chain, a hash of the previous block that was added to the lower frequency ring chain, and a hash of a second oldest block in the lower frequency ring chain;
   removing a tail block from the lower frequency ring chain, wherein the tail block is the oldest block stored on the lower frequency ring chain; and
   storing the generated aggregated record block to the lower frequency ring chain.

12. The computer system of claim 11, wherein the one or more characteristics associated with a block in the set of monitored blocks includes a time that the block was added to the ring chain and wherein the predetermined condition associated with the lower frequency ring chain is an amount of time that has passed since the addition of the new block to the lower frequency ring chain.

13. The computer system of claim 11, wherein the one or more characteristics associated with a block in the set of monitored blocks includes an amount of data stored in the block and wherein the predetermined condition associated with the lower frequency ring chain is a threshold amount of data stored among the set of monitored blocks.

14. The computer system of claim 11, wherein new blocks are added to the ring chain with higher frequency than the rate at which new blocks are added to the lower frequency ring chain.

15. The computer system of claim 11, wherein the aggregated data from the set of blocks includes identification of a first block and a last block in the monitored set of blocks of the ring chain.

16. The computer system of claim 11, wherein the data in the aggregated record block further comprises aggregated data from an identified set of blocks of a third ring chain, wherein new blocks are added to the third ring chain with higher frequency than the rate at which new blocks are added to the lower frequency ring chain.

17. A non-transitory computer-readable storage medium storing computer program instructions executable by one or more processors of a system to perform steps comprising:
receiving data to be added to the ring chain;
generating a block for inclusion in the ring chain, the block comprising the received data, a hash of a previous block that was added to the ring chain, and a hash of a second oldest block in the ring chain disposed at least one position before the previous block that was added to the ring chain;
removing a tail block from the ring chain, wherein the tail block is an oldest block stored on the ring chain; and
storing the generated block to the ring chain.

18. The non-transitory computer-readable storage medium of claim 17, wherein a ring chain comprises an ordered set of data blocks wherein the number of data blocks in the set is limited.

19. The non-transitory computer readable storage medium of claim 17, the steps further comprising:
monitoring a set of blocks that includes blocks that are added to the ring chain subsequent to the addition of a new block to a lower frequency ring chain;
determining one or more characteristics associated with the set of monitored blocks; responsive to the one or more characteristics associated with the set of monitored blocks satisfying a predetermined condition associated with the lower frequency ring chain;
generating an aggregated record block for inclusion in the lower frequency ring chain, the aggregated record block comprising aggregated data from monitored set of blocks of the ring chain, a hash of the previous block that was added to the lower frequency ring chain, and a hash of a second oldest block in the lower frequency ring chain;
removing a tail block from the lower frequency ring chain, wherein the tail block is the oldest block stored on the lower frequency ring chain; and
storing the generated aggregated record block to the lower frequency ring chain.

20. The non-transitory computer readable storage medium of claim 19, wherein the one or more characteristics associated with a block in the set of monitored blocks includes a time that the block was added to the ring chain and wherein the predetermined condition associated with the lower frequency ring chain is an amount of time that has passed since the addition of the new block to the lower frequency ring chain.

21. The non-transitory computer readable storage medium of claim 19, wherein the one or more characteristics associated with a block in the set of monitored blocks includes an amount of data stored in the block and wherein the predetermined condition associated with the lower frequency ring chain is a threshold amount of data stored among the set of monitored blocks.

* * * * *